United States Patent [19]
Abel

[11] 4,392,753
[45] Jul. 12, 1983

[54] CARTRIDGE BEARING ASSEMBLY
[75] Inventor: Martin L. Abel, Franklin, Mich.
[73] Assignee: Permawick Bearing Corporation, Detroit, Mich.
[21] Appl. No.: 257,098
[22] Filed: Apr. 24, 1981

Related U.S. Application Data
[63] Continuation of Ser. No. 81,614, Oct. 3, 1979, abandoned.

[51] Int. Cl.³ .............................................. F16C 17/02
[52] U.S. Cl. ............................... 384/136; 308/DIG. 8
[58] Field of Search ................ 308/36.4, 72, 121, 125, 308/132, 134.1, DIG. 8, DIG. 9, 111, 110; 384/136, 135, 402, 408, 409, DIG. 8

[56] References Cited
U.S. PATENT DOCUMENTS

| | | | |
|---|---|---|---|
| 1,118,043 | 11/1914 | Phelan | 308/111 |
| 1,654,100 | 12/1927 | Skaer et al. | 308/111 |
| 2,761,746 | 9/1956 | Abel | 308/72 |
| 2,922,682 | 1/1960 | Abel | 308/132 |
| 3,034,838 | 5/1962 | Abel | 308/72 |
| 3,208,940 | 9/1965 | Owens et al. | 252/45 |
| 3,208,941 | 9/1965 | Owens | 252/45 |
| 3,280,027 | 10/1966 | St. Pierre et al. | 252/45 |
| 3,317,256 | 5/1967 | Ernest | 308/132 |
| 3,393,025 | 7/1968 | Jenkins | 308/132 |
| 3,641,990 | 2/1972 | Kinnersly | 184/6.5 |
| 3,655,249 | 4/1972 | Abel | 308/72 |
| 3,704,923 | 12/1972 | Rajna | 308/132 |
| 4,008,928 | 2/1977 | Abel | 308/72 |

FOREIGN PATENT DOCUMENTS

| | | |
|---|---|---|
| 442660 | 12/1936 | United Kingdom . |
| 469867 | 4/1937 | United Kingdom . |
| 1069000 | 5/1967 | United Kingdom . |
| 31359595 | 7/1974 | United Kingdom . |

Primary Examiner—Lenard A. Footland
Attorney, Agent, or Firm—Lane, Aitken & Kananen

[57] ABSTRACT

A self-aligning, self-contained, self-lubricating cartridge bearing assembly including a nonporous bearing member having a central bore sized to receive a rotatable shaft. The bearing member has an aperture extending radially from its central bore to its outer surface to receive a contactor made of fibrous material. The bearing member is made of aluminum alloy. The bearing member is held in a mounting member by two retainers. An oil-impregnated wicking material surrounds the bearing member and contactor. An oil slinger sized to fit on the rotatable shaft for rotation therewith is positioned adjacent to the bearing member to sling lubricant radially outward. End caps are provided which retain the oil-impregnated wicking material inside the bearing assembly.

12 Claims, 4 Drawing Figures

CARTRIDGE BEARING ASSEMBLY

This application is a continuation of application Ser. No. 81,614, filed Oct. 3, 1979, now abandoned.

BACKGROUND OF THE INVENTION

1. Field of the Invention

This invention relates to the construction and metallurgy of journal bearings, and more particularly to self-aligning, self-lubricating cartridge bearings of simple construction and low cost which can be marketed in the same manner as and used in place of more expensive ball bearings.

2. Description of the Prior Art

The art of journal bearings is well-developed. The following patents define the state of the art prior to the present invention.

My U.S. Pat. No. 2,761,746 granted on Sept. 4, 1956 described a self-contained package sleeve bearing which employed a sintered metal bearing material having a low PV rating, the PV rating being the product of the load on the bearing in pounds per square inch multiplied by the surface velocity in feet per minute.

My U.S. Pat. No. 2,922,682 granted Jan. 26, 1960 described a self-aligning and self-lubricating bearing of simple construction. The bearing was fabricated of sintered metal having porous properties which enabled lubricating oil applied to its outer surface to penetrate through the body of the bearing to the rotating motor shaft. The bearing was of spherical shape and rotated in its support and was self-aligning with respect to the motor shaft.

My U.S. Pat. No. 3,034,838 granted May 15, 1962 described a bearing permitting limited universal movement of the rotating motor shaft. The bearing was made of a porous bushing of bronze or like bearing material having a truncated spherical outer surface.

U.S. Pat. No. 3,317,256 to Ernest granted on May 2, 1967 described a bearing unit having a lubricant reservoir with a retainer for housing the lubricant, the retainer being adapted to be secured to relatively thin sheeted plates. The bearing was preferably an oil-impregnated sintered bronze.

My U.S. Pat. No. 3,655,249 granted on Apr. 11, 1972 described a self-contained, hydrodynamically lubricated packaged sleeve bearing having inner and outer races similar to the inner and outer races of a ball bearing. The outer race was rotatably journaled on the inner race by a plurality of arcuate aluminum bearing elements. A wicking material impregnated with special oil for lubricating aluminum bearing surfaces was packed in the bearing and the bearing was closed to contain and recirculate the oil. In the preferred embodiment, the aluminum metal bearing comprised a plurality of arcuate bearing elements cut and formed from an extruded aluminum wire or rod. The bearing elements were assembled between the inner and outer races to provide limited universal movement between the inner and outer races to compensate for shaft misalignment.

And finally, my U.S. Pat. No. 4,008,928 granted Feb. 22, 1977 described a self-aligning pod bearing assembly including a cylindrical casing forming a socket for a bead-shaped porous bearing which was urged against the socket by means of a resilient bearing retainer which fitted between a shoulder portion of the casing and the spherical bearing. The inside of the casing was filled with wicking material exposed through the bearing retainer to an oil slinger mounted for rotation with the shaft adjacent the end of the bearing contacted by the retainer. Another oil slinger was rotationally mounted on the shaft adjacent the other end of the bearing. In the preferred embodiment, the outer diameter of the casing was formed by the same casing member which formed the interior bearing socket thus insuring coaxiality of the nominal bearing axis and the outer diameter of the casing.

SUMMARY OF THE INVENTION

The present invention is a self-aligning, self-contained, self-lubricated cartridge bearing assembly which is economical and simple in construction and metallurgy, and yet provides a quality cartridge bearing assembly having a high PV rating.

There are several important contributions to the progress of the useful art of journal bearings in the present invention. Of particular importance is the fact that, although aluminum is a notoriously treacherous metal when used in bearings, this invention is, for the first time, a commercially satisfactory journal bearing assembly having a bearing member made of low cost die cast aluminum alloy.

The inventive cartridge bearing assembly includes a nonporous bearing member having a central bore sized to receive a rotatable shaft in a bearing relationship. The bearing member has a radially-extending aperture extending from its central bore to its outer surface. The bearing member is made of aluminum alloy. A contractor is inserted in the radially-extending aperture of the bearing member and contacts the rotatable shaft. The contactor is made of fibrous material. The bearing member is supported by support means provided inside a mounting member having an outer surface and an inner surface. A lubricant-impregnated wicking material is located inside the bearing assembly in contact with the contactor. An oil slinger sized to fit on the rotatable shaft for rotation therewith is positioned adjacent to the bearing member to sling lubricant radially outward. End caps are provided for retaining the lubricant-impregnated wicking material inside the bearing assembly.

DESCRIPTION OF THE PREFERRED EMBODIMENTS

The self-aligning bearing assembly described herein is referred to as a cartridge journal bearing because the bearing member is housed within a cylindrical mounting member adapted to be fitted in a mounting hole, for example, in the end bell of an electric motor. In this way, the cartridge bearing can be employed as a direct replacement for other types of bearings having a cylindrical casing, such as ball bearings, commonly used in high quality fractional horsepower motors. Two preferred embodiments of the cartridge bearing assembly will be described.

Figure 1:
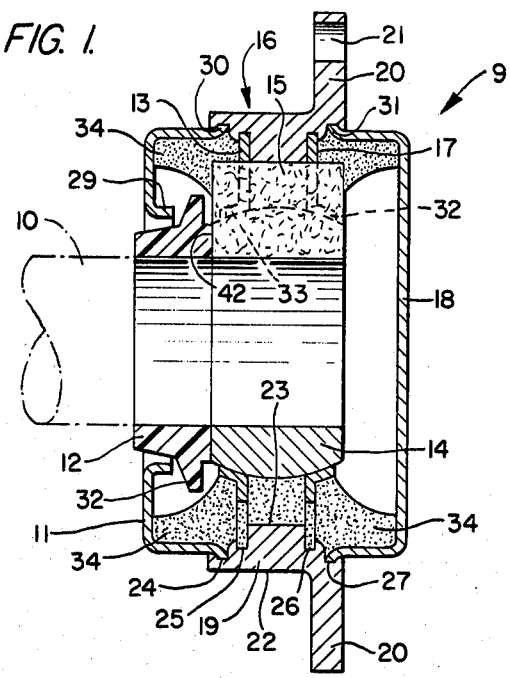
FIG. 1 is a vertical cross-sectional view through the longitudinal axis of the first embodiment of a cartridge bearing assembly constructed in accordance with the principles of the invention.
Figure 2:
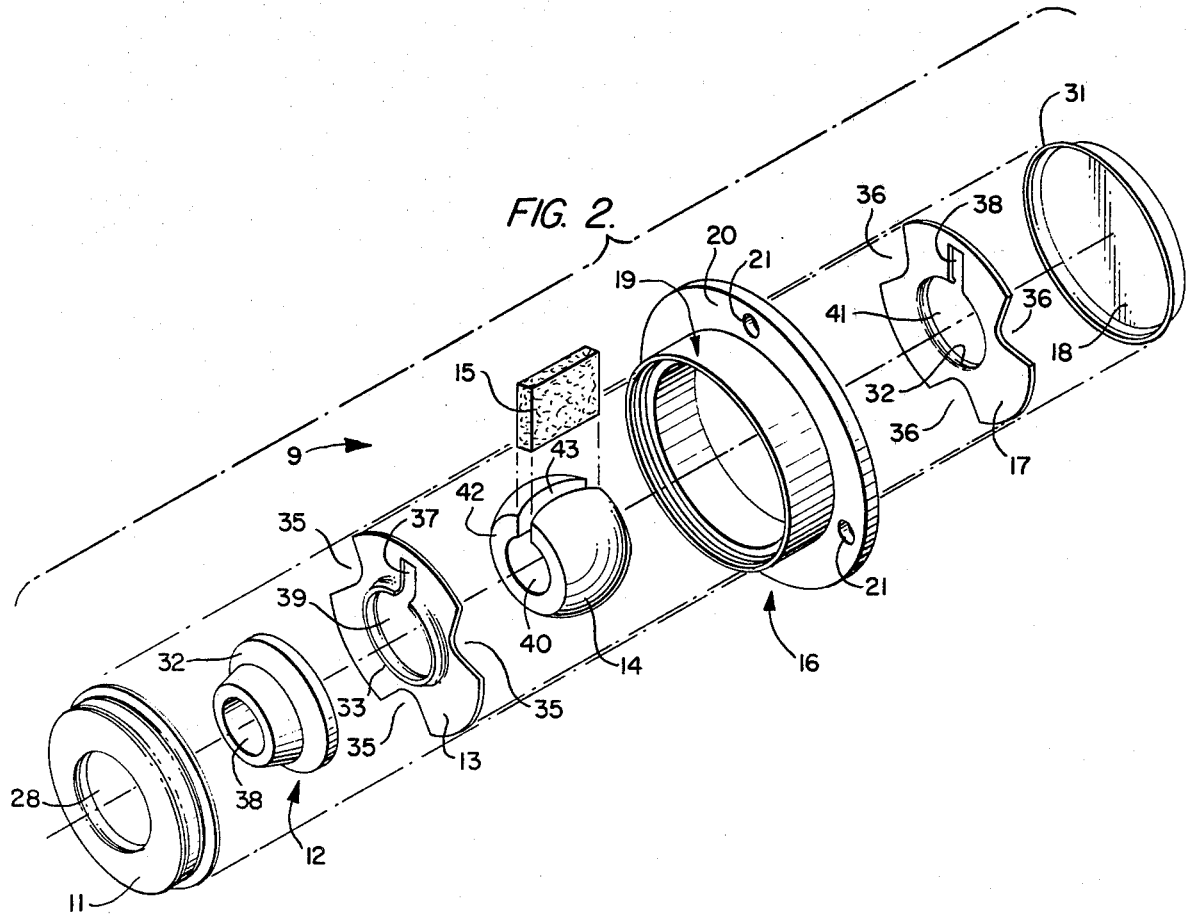
FIG. 2 is an exploded perspective view of the cartridge bearing assembly of FIG. 1.

The First Preferred Embodiment (FIGS. 1 and 2)

The first preferred embodiment is shown in FIGS. 1 and 2. This embodiment is for application where the journal shaft extends beyond the bearing at only one end, for example, where the bearing assembly is used to support the rotor shaft at the blind end of an electric motor.

As shown in FIG. 1, cartridge bearing assembly 9 supports rotatable shaft 10. FIG. 2 illustrates the disassembled structural elements of bearing assembly 9, except for oil-impregnated wicking material 34 which is shown only in FIG. 1. These structural elements in FIG. 2 are: end cap 11; oil slinger 12; bearing retainer 13; bearing member 14; contactor 15; mounting member 16; bearing retainer 17; and, end cap 18.

Ring-shaped end cap 11, which is made of a relatively thin, durable material (such as sheet metal), has a central coaxial aperture 28 of sufficient diameter to allow the passage of shaft 10 without contact. The inner edge of cap 11 curves inwardly to form annular lip 29 (FIG. 1). The outer edge of cap 11 curves outwardly to form annular lip 30. End cap 18 is made of the same material as cap 11. The outer edge of cap 18 curves outwardly to form annular lip 31; cap 18 has no central aperture.

Ring-shaped oil slinger 12, which also functions as a thrust bearing, has radially-extending flange 32 and bore 38 for receiving shaft 10. Oil slinger 12 is press-fitted on journal shaft 10 so that it rotates on the shaft at a location adjacent to the truncated or planar side 42 of bearing 14. The barrel portion of oil slinger 12 extends out through opening 28 (FIG. 1).

Circular bearing retainer 13 has central aperture 39 of sufficient diameter to pass shaft 10 without contact and radial inner lip 33 defining a spherical annulus. Retainer 13 has peripheral notches 35 and vertical slot 37 to receive contactor 15. Bearing retainer 17, having central aperture 41, peripheral notches 36, radial inner lip 32 defining a spherical annulus, and vertical slot 38, is identical to retainer 13. As shown in FIG. 2, retainer 17 faces end cap 18 while retainer 13 faces end cap 11. Retainers 13 and 17 are made of a relatively thin, durable material, such as sheet metal.

Bearing member 14 is preferably a bead-shaped, truncated spherical nonporous bearing with central bore 40 and radially-extending full length window or aperture 43 which receives contactor 15. As shown in FIG. 1, bearing 14 is held in place by the spherical annulus of lip 33 and the spherical annulus of lip 32. In this way, bearing 14 is gripped in a captive ball-and-socket configuration allowing universal pivoting about the center of the spherical bearing. Thus, bearing 14 is self-aligning. Bore 40 has an inside diameter slightly larger than the outside diameter of shaft 10 (e.g., there exists a bearing clearance) so that shaft 10 rotates freely in bearing 14 while bearing 14 remains stationary. Alternatively, bearing 14 can be made in a cylindrical bushing configuration (not shown), but the advantage of self-alignment is sacrificed.

For the first time in the art of journal bearings, the bearing member is made of die cast aluminum alloy. Bearing 14 is die cast under pressure from molten aluminum. Bore 40 is sized by machining, but no other machining is necessary. That the non-porous die cast bearing may thereafter be machined does not change the fact that it is die cast metal as contrasted to sintered metal, for example. Thus, one advantage of this invention is the low cost. Another advantage is that bore 40 can be machined to fit various shaft sizes; this simplifies production and inventory.

A preferred aluminum alloy has the following metallurgical analysis (percentages by weight):

| Cu | Ni | Fe | Si | Cr | Mg | Mn | Zn | Ti | Al |
|---|---|---|---|---|---|---|---|---|---|
| 3.30 | 0.02 | 1.0 | 8.60 | 0.06 | 0.10 | 0.43 | 0.80 | 0.03 | Balance |

Rectangular contactor 15 fits in window 43. It extends above bearing 14 through slot 37 in retainer 13 and slot 38 in retainer 17. Contactor 15 can be made of F-5 felt, which is denser or more tightly matted than F-12 felt which is commonly used for lubricating sleeve bearings. Contactor 15 can also be an improved contactor of the type described in my copending patent application, Ser. No. 618,337, filed Oct. 1, 1975, now U.S. Pat. No. 4,174,139 granted on Nov. 13, 1979 and entitled Bearing Assembly with Improved Contactor, which is incorporated herein by reference. In general terms, that improved contactor is formed by compressing a fibrous material, such as cotton linters, in a mold of appropriate shape to a predetermined density and by saturating the compressed fibers with a bonding and coating agent, such as dissolved nylon, which forms a somewhat solid mass and which contains a network of interconnected pores throughout. The pores are smaller than the interstices between the fibers in the wicking material so that the oil will be drawn into the contactor by capillary action. This can be accomplished by making the density of the fibers in the contactor, before the bonding agent is added, greater than the density of the similar fibers used in the wicking material. The improved contactor releases to the bearing surfaces a greater percentage of the oil held by the wicking material than did the prior art contactors.

As shown in FIG. 1, a lubricant-impregnated wicking material 34 partially fills the space between end cap 11 and spring retainer 13 and the space between spring retainer 17 and end cap 18. Wicking material 34 completely fills the compartment between spring retainers 13 and 17, thereby surrounding the outer surface of bearing 14 and contactor 15. Alternatively, contactor 15 can be eliminated and wicking material 34 can fill aperture 43 and contact shaft 10.

The wicking material can be felt or other wicking material, but perferably comprises cellulose fibers as described in my U.S. Pat. No. 2,966,459 granted on Dec. 27, 1960 and my U.S. Pat. No. 3,466,244 granted on Sept. 9, 1969. This wicking material is sold commercially under the trademark PERMAWICK.

However, the term "lubricant-impregnated wicking material" is not to be construed as limited to wicking materials in which the oil-absorbing portion of the material is made of fibers. This term is intended to include any fluent oil-impregnated material in which oil-absorbing solids are present.

The bearing oil which is mixed with the wicking material is a bearing oil specially blended for lubricating aluminum bearings. Examples of such aluminum bearing oils are described in U.S. Pat. No. 3,208,941 granted on Sept. 28, 1965 and entitled Olefin-Unsaturated Ester Lubricants, U.S. Pat. No. 3,208,940 granted on Sept. 28, 1965 and entitled Lubricating Compositions and Methods of Lubricating, and U.S. Pat. No. 3,280,027 granted on Oct. 18, 1966 and entitled Lubricants and Lubricated Structures.

Preferably, the aluminum bearing oil is mixed with the cellulose fibers, as described in my U.S. Pat. No. 3,466,244, to form a mixture of the aluminum bearing oil and the fibers in the proportions described therein which can be injected into the bearing assembly. The extrusion or injection of the wicking material may be carried out by the extrusion machinery and methods described in my U.S. Pat. No. 3,053,421 granted on Sept. 11, 1962 and entitled Injection Machines For Wicking Material, my U.S. Pat. No. 3,226,801 granted on Jan. 4, 1966 and entitled Fiber Producing Machine Which Delivers Wicking Material Made Therefrom Into A Bearing Well and The Method Therefor and my U.S. Pat. No. 3,273,668 granted on Sept. 20, 1966 and entitled Extrusion Apparatus And Method. Since the oil-impregnated wicking material used in bearing assembly 9 is the same as that described in my U.S. Pat. No. 3,466,244, with the exception that a known aluminum bearing oil (described above) is used in place of the bearing oil disclosed in my patent, the mixture will not be described in greater detail.

The aluminum bearing oil in wicking material 34 is drawn by capillary action to contactor 15. Contactor 15 applies the oil to shaft 10 to form a lubricating oil surface (e.g., hydrodynamic lubricating conditions are realized at a certain shaft speed) to isolate the shaft from the bearing surface. As the oil works its way out of bore 40 it is slung back into the body of wicking material 34 by means of radial flange 32. The oil is reabsorbed by the wicking material, circulated to the contactor 15 and then to the shaft. This provides a completely self-contained recirculating system which will lubricate the bearing for a long period of time.

In this first embodiment, mounting member 16 consists of an elongated barrel portion 19 having a radially-extending circumferential mounting flange 20. Flange 20 is provided with holes 21 for receiving suitable fastening means (bolts, screws, etc.) to securely mount the bearing assembly. Barrel portion 19 has a smooth cylindrical outer surface 22 and a coaxial bore with smooth cylindrical inner surface 23 and four annular shoulders 24, 25, 26, 27 (FIG. 1).

Mounting member 16 is made of rigid, durable material, such as hard molded plastic, machined metal (e.g., machined aluminum), or, preferably, die cast metal (e.g., die cast aluminum). The outside diameter of barrel portion 19 will be dictated by the particular application. For example, if bearing assembly 9 is to replace a ball bearing, the outside diameter of barrel portion 19 would match the outside diameter of the ball bearing.

A significant advantage of the die cast preferred embodiment of mounting member 16 is that it can be die cast of aluminum alloy with barrel portion 19 having a large outside diameter and a small bore. Different size inside and outside diameters can be produced thereafter by simply machining excess material from the outside and the bore. In this way, one basic die cast mounting member 19 can be easily modified to replace several of the different standard size ball bearings.

In production, bearing retainer 17 is inserted in mounting member 16 and seated on shoulder 26. The edge of shoulder 26 is peened over with a tool so that the outer edge of retainer 17 is tightly gripped in place. End cap 18 is seated on shoulder 27 of mounting member 16. Again, a tool is used to peen over the edge of shoulder 26 to securely grip lip 31. Bearing 14 is placed in aperture 41. Contactor 15 is inserted in window 43 and through slot 38.

Bearing retainer 13 is inserted in mounting member 16, around bearing 14 and over contactor 15. The edge of retainer 13 is seated on annular shoulder 25. The edge of annular shoulder 25 is then peened over with a tool so that the edge tightly grips retainer 13. Oil-impregnated wicking material 34 is then injected into the space between end cap 18 and retainer 17, into the compartment between retainers 13 and 17, and around retainer 13 as shown in FIG. 1. Oil slinger 12 and end cap 11 are placed in mounting member 16. Lip 30 is seated on annular shoulder 24. A tool is used to complete bearing assembly 9 by peening over the edge of shoulder 24 to securely grip lip 30.

Figure 4:
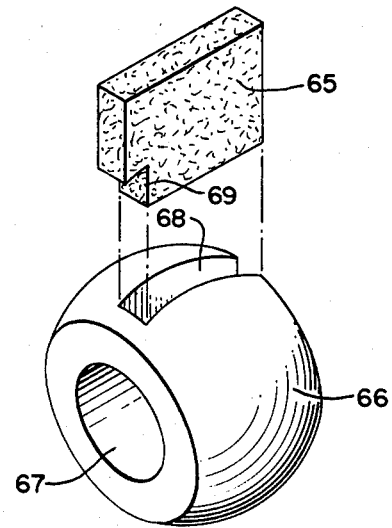
FIG. 4 is an exploded view of an alternative embodiment of the inventive bearing member and contactor.

The Second Preferred Embodiment (FIG. 4)

Figure 3:
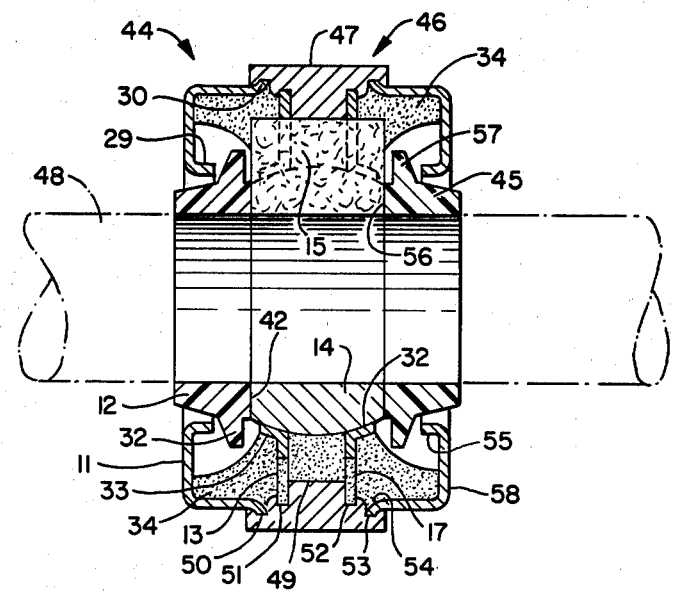
FIG. 3 is a vertical cross-sectional view through the longitudinal axis of the second embodiment of a cartridge bearing assembly constructed in accordance with the principles of the invention.

The second preferred embodiment of the invention is illustrated in FIG. 3. This embodiment is for applications where the journal shaft extends beyond the bearing in both directions, for example, where the bearing assembly is used to support the rotor shaft at the output end of an electric motor. As shown in FIG. 3, cartridge bearing assembly 44 supports rotatable shaft 48 which extends beyond the bearing assembly at both ends.

The following elements shown in FIG. 3 are the same as in FIGS. 1 and 2 and have the same reference numeral: end cap 11, having inner lip 29 and outer lip 30; oil slinger 12, having flange 32; spring retainer 13, having lip 33; spring retainer 17, having lip 32; bearing 14, having planar side 42 and planar side 56; contactor 15; and wicking material 34.

End cap 58 (FIG. 3), having inner lip 55 and outer lip 54, is identical to end cap 11. Oil slinger 45, having flange 57, is identical to oil slinger 12.

In this second embodiment, mounting member 46 has a smooth cylindrical outer surface 47 and a coaxial bore with smooth cylindrical inner surface 49 and four annular shoulders 50, 51, 52, 53.

Mounting member 46 is made of rigid, durable material, such as hard molded plastic, machined metal (e.g., machined aluminum), or, preferably, die cast metal (e.g, die cast aluminum). The outside diameter of mounting member 46 will be dictated by the particular application. For example, if bearing assembly 44 is to replace a ball bearing, the outside diameter of mounting member 46 would match the outside diameter of the ball bearing.

A significant advantage of the die cast preferred embodiment of mounting member 46 is that it can be die cast of aluminum alloy with a large outside diameter and a small bore. Different size inside and outside diameters can be produced thereafter by simply machining excess material from the outside and the bore. In this way, one basic die cast mounting member 46 can be easily modified to replace several of the different standard size ball bearings.

In production, bearing assembly 44 is made in a manner similar to that described above for bearing assembly 9, the first embodiment.

FIG. 4 illustrates an alternative embodiment of the bearing member and contactor. In FIG. 4, bearing 66 is made of aluminum alloy as described above for bearing 14. Bearing 66 is identical to bearing 14, except radially-extending window 68 is a partial-length window instead of a full-length window. Similarly, rectangular contactor 65 has notch 69 cut from one corner for proper seating in window 68. The top portion of contactor 65 extends above window 68 and above the remainder of bearing 66. One advantage of this alternative embodiment is that bearing 66 is stronger (because the window does not extend the full length of the bearing) and hence less subject to distortion under very heavy shaft loads.

The above-described embodiments are intended to be illustrative, not restrictive. The full scope of the invention is defined by the claims, and any and all equivalents are intended to be embraced.

What is claimed is:

1. A bearing assembly for supporting a rotatable shaft to be journaled in the bearing assembly, comprising:
   (1) a separate nonporous bearing member made of die cast aluminum alloy having a central bore sized to receive the rotatable shaft in a bearing relationship, said bearing member having a spherical shape and having a radial aperture extending from its central bore to its outer surface;
   (2) a mounting member wherein said mounting member has an outer surface which is at least partially cylindrical and an inner surface which is at least partially cylindrical and wherein said mounting member is made of die cast aluminum alloy and has a radially-extending mounting flange;
   (3) support means for supporting said bearing member inside said mounting member;
   (4) a lubricant-impregnated wicking material, impregnated with aluminum bearing oil, located inside said bearing assembly and in said radial aperture of the bearing member, said portion located in said radial aperture being adapted to contact said rotatable shaft; and,
   (5) cap means for retaining said lubricant-impregnated wicking material inside said bearing assembly.

2. A bearing assembly as defined in claim 1, further comprising an oil slinger sized to fit on the rotatable shaft for rotation therewith, said oil slinger being positioned interiorly from said cap means and adjacent to one end of said bearing member to sling lubricant radially outward.

3. The bearing assembly defined in claim 2 wherin said cap means comprises a first end cap and a second end cap, each having a coaxial aperture for passage of the rotatable shaft.

4. The bearing assembly defined in claim 3 further comprising a second oil slinger sized to fit on the rotatable shaft for rotation therewith, said second oil slinger being positioned interiorly from said end cap and adjacent to the end of said bearing member opposite from said first oil slinger.

5. A bearing assembly as defined in claim 1 wherein said aperture in the bearing member is a longitudinal window.

6. A bearing assembly as defined in claim 1 wherein said portion of the lubricant-impregnated wicking material in the radial aperture of the bearing member is a separate contactor having a predetermined configuration, the outer surface of said contactor being in intimate contact with the remainder of said lubricant-impregnated wicking material.

7. The bearing assembly defined in claim 1 wherein said support means for supporting said bearing member comprises at least one retainer, said retainer having a coaxial aperture adapted to receive said bearing member.

8. A bearing assembly for supporting a rotatable shaft to be journaled in the bearing assembly, comprising:
   (1) a separate nonporous bearing member made of die cast aluminum alloy having a central bore sized to receive the rotatable shaft in a bearing relationship, said bearing member having a spherical shape and having a radial aperture extending from its central bore to its outer surface;
   (2) a mounting member having an outer surface and an inner surface;
   (3) support means for supporting said bearing member inside said mounting member;
   (4) a lubricant-impregnated wicking material, impregnated with aluminum bearing oil, located inside said bearing assembly and in said radial aperture of the bearing member, said portion located in said radial aperture being adapted to contact said rotatable shaft; and,
   (5) cap means for retaining said lubricant-impregnated wicking material inside said bearing assembly wherein said nonporous bearing member made of die cast aluminum alloy has substantially the following metallurgical analysis (percentages by weight):

| Cu | Ni | Fe | Si | Cr | Mg | Mn | Zn | Ti | Al |
|---|---|---|---|---|---|---|---|---|---|
| 3.30 | 0.02 | 1.0 | 8.60 | 0.06 | 0.10 | 0.43 | 0.80 | 0.08 | Balance |

9. A bearing assembly for supporting a rotatable shaft to be journaled in the bearing assembly, comprising:
   (1) a separate nonporous bearing member made of die cast aluminum alloy having a central bore sized to receive the rotatable shaft in a bearing relationship, said bearing member having a spherical shape and having a radial aperture extending from its central bore to its outer surface;
   (2) a mounting member having an outer surface and an inner surface wherein the inner surface is at least partially cylindrical and wherein said mounting member is made of die cast aluminum alloy and has a smooth outer surface which is entirely cylindrical;
   (3) support means for supporting said bearing member inside said mounting member;
   (4) a lubricant-impregnated wicking material, impregnated with aluminum bearing oil, located inside said bearing assembly and in said radial aperture of the bearing member, said portion located in said radial aperture being adapted to contact said rotatable shaft; and,
   (5) cap means for retaining said lubricant-impregnated wicking material inside said bearing assembly.

10. The bearing assembly defined in claim 9 wherein the outer surface of said mounting member is entirely cylindrical and has an outside diameter sized to permit said bearing assembly to be inserted as a self-contained unit in a bore in the manner of a ball bearing unit.

11. A bearing assembly for supporting a rotatable shaft to be journaled in the bearing assembly, comprising:
   (1) a separate nonporous bearing member made of die cast aluminum alloy having a central bore sized to receive the rotatable shaft in a bearing relationship, said bearing member having a spherical shape and having a radial aperture extending from its central bore to its outer surface;
   (2) a mounting member having an outer surface and an inner surface;

(3) support means for supporting said bearing member inside said mounting member;
(4) a lubricant-impregnated wicking material, impregnated with aluminum bearing oil, located inside said bearing assembly and in said radial aperture of the bearing member, said portion located in said radial aperture being adapted to contact said rotatable shaft; and,
(5) cap means for retaining said lubricating-impregnated wicking material inside said bearing assembly wherein said cap means comprises a first end cap having a coaxial aperture for passage of the rotatable shaft and a second end cap having no aperture.

12. A bearing assembly for supporting a rotatable shaft to be journaled in the bearing assembly, comprising:
(1) a nonporous bearing member made of die cast aluminum alloy having a spherical shape, said bearing member having a central bore sized to receive the rotatable shaft in a bearing relationship, said bearing member having a longitudinal window extending from its central bore to its outer surface;
(2) a contactor made of fibrous material inserted in said longitudinal window of the bearing member and adapted to contact said rotatable shaft, said contactor having a rectilinear shape;
(3) a mounting member having a cylindrical barrel portion and a radially-extending mounting flange, said barrel portion having an inner surface which is cylindrical;
(4) support means for supporting said bearing member inside said mounting member, said support means comprising a first retainer and a second retainer, each having a coaxial aperture adapted to receive said bearing member;
(5) a lubricant-impregnated wicking material, impregnated with aluminum bearing oil, located inside said bearing assembly and contacting said contactor;
(6) cap means for retaining said lubricant-impregnated wicking material inside said bearing assembly, said cap means comprising a first end cap having a coaxial aperture for passage of the rotatable shaft and a second end cap having no aperture; and,
(7) an oil slinger sized to fit on the rotatable shaft for rotation therewith, said oil slinger being positioned interiorly from said first end cap and adjacent to one end of said bearing member to sling lubricant radially outward.

* * * * *